Nov. 10, 1931.  B. E. SNIDER  1,831,688
TRAP
Filed July 24, 1929
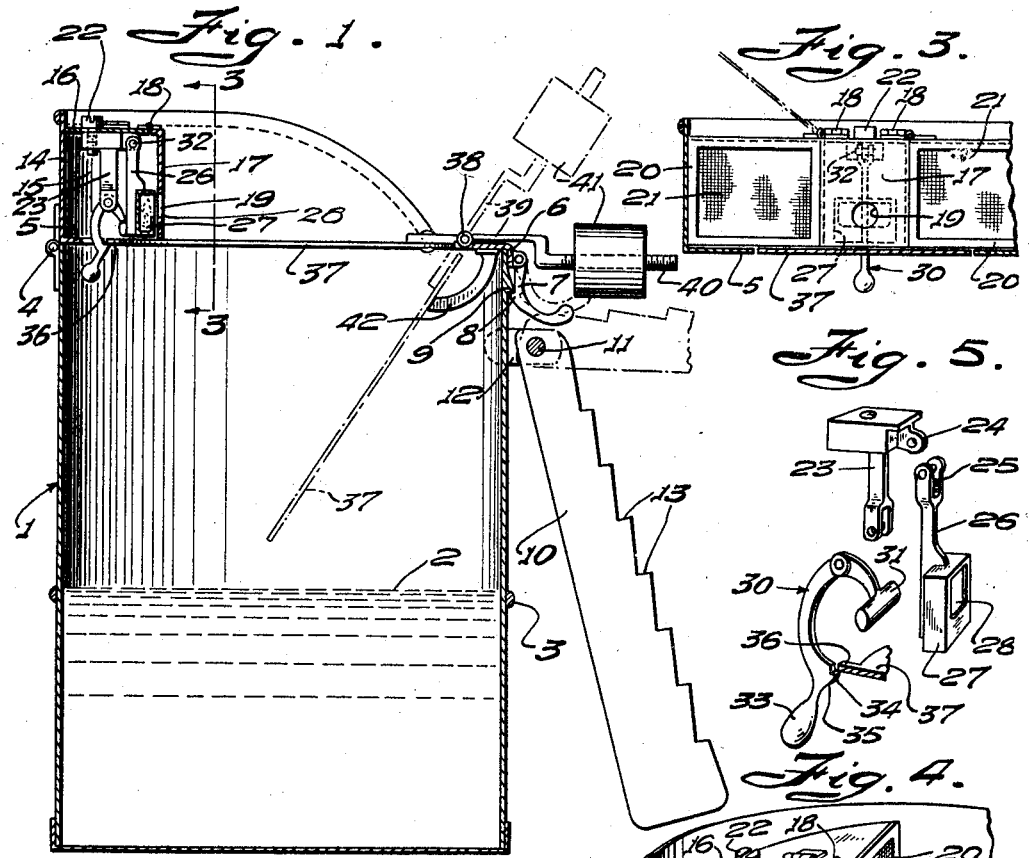
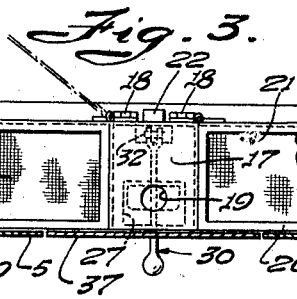
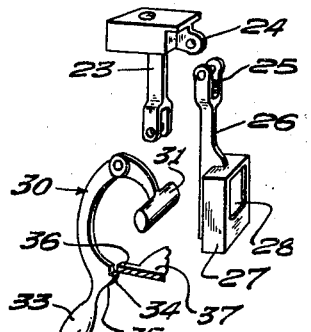
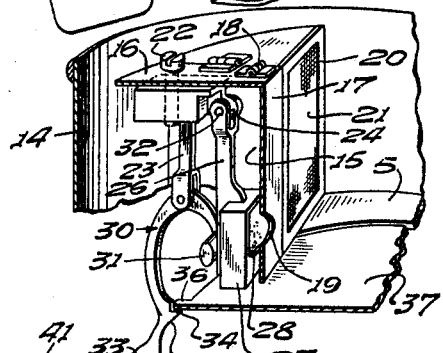
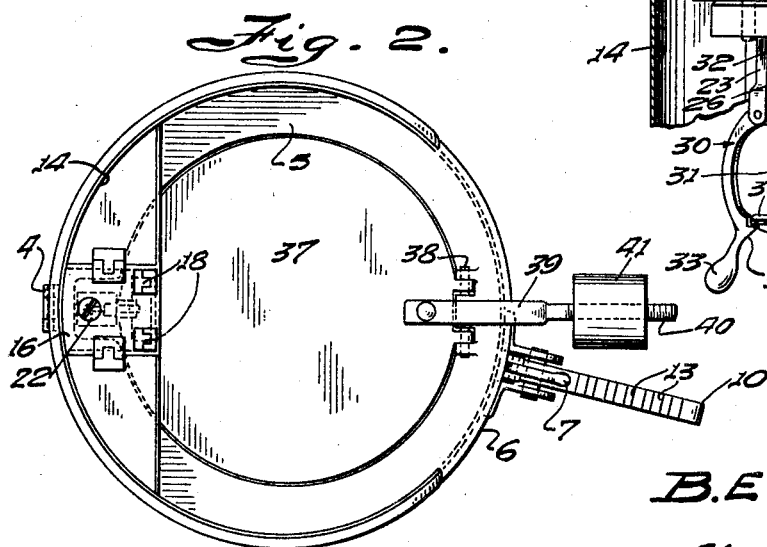
B. E. SNIDER
INVENTOR
BY *Victor J. Evans*
ATTORNEY Patented Nov. 10, 1931

1,831,688

UNITED STATES PATENT OFFICE

BENJIMEN E. SNIDER, OF HEMET, CALIFORNIA

TRAP

Application filed July 24, 1929. Serial No. 380,619.

My present invention has reference to improved construction of traps for catching vermin, such as rats or the like.

An object of the invention is to provide a trap which will automatically reset itself after catching a rat or mouse, as well as one in which the same bait may be employed for a comparatively great length of time, inasmuch as the bait is never consumed by the animals, so that the bait will be sufficient for a number of catches.

A still further object is the provision of a trap whose body is designed to contain therein a quantity of water or like exterminating fluid, whose top is in the nature of a hinged and latched ring provided with an upstanding rear and side wall, the rear wall being provided with a compartment in which the bait box is swingably supported and likewise in which there is pivotally supported a combined trigger and catch for a disc which is hingedly secured in the ring and affords a false top for the body, together with adjustable weighted means for returning the false top to a position to be engaged by the latch after the animal has contacted with the bait in the box and swung the trigger to release the latch and thereby permit of the weight of the animal tilting the false top and precipitating the animal into the body of the trap, together with a handle that affords steps whereby the animal may travel onto the false top or trap door, and which handle, when swung to horizontal position releases the catch means between the top and the body so that the trapped animals may be readily removed from the body.

To the attainment of the foregoing and other objects which will present themselves as the nature of the invention is better understood, the improvement further resides in certain other novel features of construction, combination and operative association of parts, one satisfactory embodiment of which is disclosed by the accompanying drawings.

In the drawings:

Figure 1 is a central longitudinal sectional view through a trap in accordance with this invention.

Figure 2 is a top plan view thereof.

Figure 3 is a detail sectional view on the line 3—3 of Figure 1.

Figure 4 is a fragmentary perspective view through the upper portion of the trap.

Figure 5 is a perspective view to illustrate in detail the parts arranged in the outer compartment of the trap and the said parts being separated.

In carrying out my invention I provide a preferably cylindrical body 1 that has a closed bottom and an open top. In the cylindrical body there is arranged a quantity of water or vermin exterminating fluid 2, the said body being preferably provided with a continuous rib 3 whereby the level of the fluid 2 is determined.

There is hingedly secured, as at 4, to the open top of the body 1 a ring top 5. The ring top may be flanged, or at any event has on its edge opposite that provided with the hinge 4 a depending portion or flange 6 that carries a lug to which is pivoted a curved catch member 7. The tooth 8 of this catch member 7 is designed to engage with a lug 9 formed on the body 1, and the rounded body of the catch member is in the path of contact with a handle 10, which is pivoted, as at 11, to brackets 12 that are fixed on the body 1, when the said handle member is swung to horizontal position. By thus swinging the handle member it will be obvious that the catch 7 is swung to release position so that the ring top 5 of the body 1 may be swung to open position. The outer edge of the handle 10 is notched to provide the same with steps 13. When the device is in operative position the outer or free end of the handle preferably rests on the floor on which the body 1 is supported and the steps 13 of the normally angularly arranged handle afford means whereby mice or rats may travel on the steps thereof and onto the ring top 5 of the trap. The ring top 5 is provided at its rear and along its sides with an upstanding flange 14 and between the sides and rear of the flange 14 there is arranged a compartment 15. The upper wall 16 of this compartment is fixedly secured to the flange 14, but the outer and vertical wall 17 of the said compartment is hingedly secured, as at 18, to the upper wall 16. This upper wall is centrally provided with an opening 19, and the said vertical wall 17 provide the door for the compartment. This door is centrally arranged and is swingable between frames 20 that provides the outer walls proper of the compartment 15, the said frames having secured thereon mesh or like reticulated facings 21. These reticulated plates 21 permit the animal to be trapped more clearly observing the bait in the bait pan which will presently be described.

Secured to the top 16 of the compartment 15 through the medium of a bolt or screw 22 there is the headed portion of a depending arm 23. The head outward of the arm is formed with a lug 24 that is received in and pivotally secured to the bifurcated end 25 of an arm or plate 26 upon which the bait box 27 is secured. The bait box has its outer face provided with an opening 28 that is arranged opposite the opening 19 in the door 17 and the box 27 is filled with cheese or like bait.

Pivotally secured to the lower end of the arm 23 there is a combined trigger member and catch. This member is broadly indicated by the numeral 30 and the body thereof is of substantially elliptical formation. One end of the body is formed with a transverse bar 31 which is in the nature of a trigger, the same being disposed directly to the rear of the bait box 27 so that the member 30 will be swung upon its pivotal connection 32 with the arm 23 when the bait box is swung inwardly by the muzzle of an animal inserted through the opening 19 and into the opening 28 in the bait box 27. The second end of the member 30 is formed with a weighted extension 33 and inward of the said extension the member 30 is notched to provide the same with a shoulder 34. The edge of the member 30 between the shoulder 34 and the weighted extension 33 is rounded, as indicated by the numeral 35, and on the shoulder 34 there is designed to normally rest a lip 36 that is formed on the edge of a disc 37 that provides the false top or trap door of the trap. The trap door is received in the ring top 5 and is hingedly secured thereto, as indicated by the numeral 38. To one side of the hinge and likewise to one side of the handle 10 there is fixed on the top of the trap door 37 an arm 39 which is preferably offset and which has its outer end rounded and threaded, as at 40, and on this threaded end there is screwed a weight 41. Thus the weight 41 is adjustable so that the trap may be set to catch different sizes or different weights of animals.

The animal attracted by the bait in the bait box 27 will travel up the stepped handle 10 and onto the false bottom 37. The animal will naturally attempt to secure the bait in the bait box 27 and to do this he must insert his muzzle through the opening 19 in the door 17 of the compartment 15 and likewise into the opening 28 in the bait box 27. Thus a pressure will be naturally exerted against the bait box for causing the same to swing and to contact with the trigger 31, and by swinging the element 30 on its pivot 32 to bring its shoulder or catch 34 away from the lip 36 on the trap door 37, causing the weight of the animal to swing the trap door 37 to the dotted line position in Figure 1 of the drawings and thus precipitate the animal into the fluid 2 in the body 1 of the trap. The weight 41 will return the trap door to its initial position, causing the lip 36 to travel over the rounded edge 35 of the element 30 and thus it will be noted that the trap automatically resets itself. The swinging of the trap door into the body of the trap is limited by the contact of said door with an arched finger 42 which has one end fixed to the ring top 5. As previously stated, the horizontal swinging of the handle 10 will move the latch 7 to unlatching position, permitting the ring top 5 and the trap door 37 to be swung on the hinge 4 to open position so that the drowned animals may be removed from the body of the trap.

The construction and advantages of my improvement will, it is thought, be understood and appreciated by those skilled in the art so that further detail description will not be required. It is believed, however, necessary to state that I do not wish to be restricted to the precise details herein set forth and, therefore, hold myself entiled to make such changes therefrom as fairly fall within the scope of what I claim.

What is claimed is:—

1. A trap including a hollow body, a trap door hingedly secured to the top of the body, a pivotally supported depending bait box suspended over the trap door, adjacent to the rear and non-hinged portion thereof, a pivotally supported weighted trigger influenced by the weight thereof to contact with the rear of the bait box and having a lip portion to underlie and support the trap door in normal closed position.

2. A trap comprising a water receptacle, a ring top hingedly secured to the mouth of the receptacle, said ring, at its hinged end, having a compartment provided with an opening, a bait box hingedly secured in the compartment and disposed opposite the opening, a hingedly supported trap door on the ring, a weighted pivotally supported trigger swingable to contact with the bait box to hold the same opposite the opening in the compartment and having a shouldered portion to underlie and normally sustain the trap door in the ring top.

3. A trap comprising a cylindrical body to be partly filled with a fluid, a ring member hingedly secured to the top of the body and extending inwardly thereof, an upstanding flange at the hinged end of the ring extending partly along the sides thereof, a compartment fixed to the flange at the rear thereof and having an open front, a hinged member provided with an opening for closing the front of the compartment, a bait box suspended from the top of the compartment and having its bait containing portion disposed opposite the opening, a trigger member pivoted in the compartment including an arm to contact with the rear of the bait box to hold the same opposite the opening and having its other arm weighted, formed with a shoulder and extending into the container, a disc comprising a trap door hinged to the top, a weight carrying arm at the hinged end of the trap door for influencing the same toward the compartment and the bait box and for likewise causing the shoulder on the trigger to contact and support the trap door in closed position, a catch member pivotally secured to the non-hinged end of the ring top and the body having a lug engaged thereby and a stepped member pivotally secured to the body, normally depending at an angle therefrom, and designed when swung toward the body to contact with and release the catch.

In testimony whereof I affix my signature.

BENJIMEN E. SNIDER.